United States Patent
Barbot (10) Patent No.: US 10,493,866 B2
(45) Date of Patent: Dec. 3, 2019

(54) SITTING, RECLINING AND/OR LEANING DEVICE FOR A VEHICLE AND VEHICLE WITH THE SITTING, RECLINING AND/OR LEANING DEVICE

(71) Applicant: GM GLOBAL TECHNOLOGY OPERATIONS LLC, Detroit, MI (US)

(72) Inventor: Augustin Barbot, Frankfurt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/987,652

(22) Filed: May 23, 2018

(65) Prior Publication Data

US 2018/0339606 A1    Nov. 29, 2018

(30) Foreign Application Priority Data

May 23, 2017    (DE) .................. 10 2017 004 916

(51) Int. Cl.
| | |
|---|---|
| *B60N 2/02* | (2006.01) |
| *B60N 2/62* | (2006.01) |
| *B60N 2/20* | (2006.01) |
| *B60N 2/34* | (2006.01) |
| *B60N 2/90* | (2018.01) |
| *B60N 2/24* | (2006.01) |

(52) U.S. Cl.
CPC ............. *B60N 2/0292* (2013.01); *B60N 2/20* (2013.01); *B60N 2/24* (2013.01); *B60N 2/34* (2013.01); *B60N 2/62* (2013.01); *B60N 2/986* (2018.02); *B60N 2/995* (2018.02); *B60N 2/242* (2013.01); *B60N 2002/0288* (2013.01)

(58) Field of Classification Search
CPC ............. B60N 2002/0288; B60N 2/34; B60N 2/0292; B60N 2/20; B60N 2/64; B60N 2/62; B60N 2/995; B60N 2/986; A47C 13/00
USPC .............. 297/284.9, 120, 452.4, 354.13, 119
See application file for complete search history.

(56) References Cited

U.S. PATENT DOCUMENTS

| | | | | |
|---|---|---|---|---|
| 352,723 | A * | 11/1886 | Weeden | A47C 17/18 297/112 |
| 1,955,040 | A * | 4/1934 | Wittcoff | B60N 2/60 297/219.1 |
| 4,824,171 | A * | 4/1989 | Hollingsworth | A47C 1/146 297/351 |
| 6,672,666 | B2 * | 1/2004 | Stiller | B60N 2/58 297/284.2 |
| 9,409,648 | B2 * | 8/2016 | Eakins | B64D 11/06 |
| 2005/0179291 | A1 * | 8/2005 | Brodeur | A47C 7/024 297/284.9 |

FOREIGN PATENT DOCUMENTS

| | | | | |
|---|---|---|---|---|
| DE | 102004020116 A1 | 11/2005 | | |
| FR | 2642285 A1 * | 8/1990 | ............... | A47C 1/14 |

\* cited by examiner

*Primary Examiner* — Milton Nelson, Jr.
(74) *Attorney, Agent, or Firm* — Lorenz & Kopf LLP (57) ABSTRACT

A sitting, reclining and/or leaning device is provided for arrangement in a vehicle. The device includes a seat frame and several wing elements. The wing elements are arranged on the seat frame in a shared plane when in a basic position. The wing elements may be swiveled out of the basic position into at least one swivel position.

17 Claims, 5 Drawing Sheets

SITTING, RECLINING AND/OR LEANING DEVICE FOR A VEHICLE AND VEHICLE WITH THE SITTING, RECLINING AND/OR LEANING DEVICE

CROSS-REFERENCE TO RELATED APPLICATION

This application claims priority to German Patent Application No. 102017004916.5, filed May 23, 2018, which is incorporated herein by reference in its entirety.

TECHNICAL FIELD

The present disclosure pertains to a sitting, reclining and/or leaning device for a vehicle, and more particularly to a configurable seating device.

BACKGROUND

Vehicle seats are integrated into a vehicle to offer space to passengers of the vehicle. Already known are vehicle seats whose backrest or side parts may be pivoted and/or adjusted relative to a seating surface of the vehicle seat. Further known are vehicle seats that have adjustable side plates on the backrest to enhance seating comfort for the passenger.

For example, publication DE 10 2004 020 116 A1 describes a vehicle seat with a backrest, which has a backrest frame and front backrest surface for providing lumbar support, and two side bolsters protruding laterally over the front backrest surface for providing lateral support to someone occupying the driver's seat. The side bolsters may be adjusted and swiveled relative to the front backrest surface by a swivel drive.

SUMMARY

The present disclosure provides a flexible and functional sitting, reclining and/or leaning device for a vehicle. Preferred or advantageous embodiments of the present disclosure may be derived from the following specification, claims and/or attached figures.

In accordance with the present disclosure a sitting, reclining and/or leaning device configured to be arranged in a vehicle, for example an automobile, a van or a minibus. A passenger of the vehicle can preferably occupy the device in a sitting, reclining or leaning position.

The device has a seat frame. For example, the seat frame is at least triangular, for example quadrangular, preferably square, in design. The device includes several wing elements, preferably at least three, and for example four wing elements. Each of the wing elements may be triangular, pentagonal, and/or drop-, cross-, egg-, circle-, heart- and/or cloverleaf-shaped in design. The wing elements are arranged on the seat frame. The wing elements are arranged in a shared plane in a basic position. The shared plane is preferably arranged parallel and/or co-directional to a frame plane spanned by the seat frame. Alternatively, it is possible that the wing elements be arranged in the frame plane in the basic position, so that the shared plane corresponds to the frame plane.

In an embodiment, the wing elements may be arranged like cloverleaves relative to each other. As an option, the wing elements may be arranged separately and/or independently from each other, or movably joined together by a hinge assembly.

The wing elements may be swiveled out of the basic position into at least one swivel position. Each wing element may preferably be swiveled relative to the shared plane and/or to the seat frame, in particular to the seat plane. It is also possible that two or more respective wing elements be coupled with each other, and that the latter be together swiveled into the same swivel position, in particular one of several possible swivel positions.

Because the wing elements may be swiveled into at least one swivel position, in particular into several swivel positions, an occupant of the device may flexibly and individually adjust the sitting, reclining and/or leaning device to his or her needs. The wing elements can preferably be moved from the basic position into at least one swivel position through exposure to a directed force such as a downward force. For example, the occupant exerts the force on at least one of the wing elements while sitting or lying on the wing elements, in particular in the basic position, and can thereby initiate the swiveling of one or several of the wing elements. In particular, a device in accordance with the present disclosure offers a versatile, functional and easy to operate sitting, reclining and/or leaning accommodation for the occupant.

In a preferred embodiment of the present disclosure, the device includes several swivel mechanisms for the wing elements. Each of the wing elements preferably has at least one of the swivel mechanisms allocated to it. For example, the respective wing element is placed on the allocated swivel mechanism and fastened thereto, with the respective wing element being carried by the allocated swivel mechanism. For example, the respective wing element can alternatively be held at its side edges by allocated swivel mechanisms, in particular gripped and/or accommodated.

In a preferred embodiment of the present disclosure, the wing element is swivelably joined with the seat frame by the at least one allocated swivel mechanism. The wing element together with the at least one allocated swivel mechanism may be swiveled from the basic position into the at least one swivel position. In particular, the wing element together with the at least one allocated swivel mechanism may be swiveled downwardly, in particular out of the shared plane, especially toward a vehicle floor or vehicle wall of the vehicle, and into the at least one swivel position.

Another preferred structural configuration of the present disclosure provides that the have a base. The base preferably includes at least one foot, which is configured to anchor the base in a structure of the vehicle, e.g., to the vehicle floor or in a vehicle wall. For example, the base as viewed from the side is essentially triangular, pyramidal and/or funnel-shaped in design. The base preferably spans the seat frame and/or carries the seat frame. For example, the seat frame has several frame sides, for example four frame sides.

In a preferred structural implementation of the present disclosure, the device has several guide struts for the swivel mechanisms. The guide struts preferably extend parallel and/or co-directional to the frame sides of the seat frame. Specifically, each of the guide struts is configured to guide at least one of the swivel mechanisms, and in particular the wing element allocated to the swivel mechanism. In particular, each of the swivel mechanisms is movably mounted on at least one of the guide struts. For example, each of the swivel mechanisms may be moved in a corresponding guideway of the respective guide strut. It is preferred that the swivel mechanism be moved along the guide strut in the guideway when being swiveled along with the wing element fastened thereto into at least one of the swivel positions.

Each guide strut has at least one guideway, and preferably two guideways for two swivel mechanisms.

Within the framework of the present disclosure, it is especially preferred that the guide struts, in particular each of the guide struts, be vertically adjustable relative to the seat frame, in particular relative to the respective parallel and/or equally directed frame side. The guide struts are preferably elastically mounted to the base, in particular spring-mounted. As a result, the guide struts may be downwardly or upwardly adjusted when the force acts on the wing elements, and the latter are swiveled into the at least one swivel position. At least one of the guide struts is thus vertically adjusted when the wing element guided by the swivel mechanism in the at least one guide strut is swiveled into at least one of the swivel positions. In particular, the extent to which the guide strut is vertically adjusted depends on the extent of the selected swivel position of the wing element. This means that the more the guide strut is vertically adjusted downwardly, the more the wing element guided in the guide strut is swiveled out of the basic position.

In a preferred structural implementation of the present disclosure, the guide struts have latches for the swivel mechanisms guided therein. Each guide strut preferably has at least one latch, preferably two latches, in particular for two swivel mechanisms guided in the guide strut. For example, the latches are integrated in the guideways and/or allocated thereto. In particular, each of the latches is configured to latch the corresponding guide strut into one of the swivel positions or into the basic position. As a result, the wing element allocated to the respective swivel mechanisms cannot inadvertently be released from the selected swivel position or from the basic position.

In a preferred embodiment of the present disclosure, two wing elements lying opposite each other, in particular in a top view of the shared plane, are guided in at least one shared guide strut via the swivel mechanisms allocated to the wing elements. As a result, the two opposing wing elements are coupled with each other in their position and/or swiveling. In particular, the two wing elements are always arranged together in the basic position, or they assume a corresponding and/or identical swivel position. Guiding the opposing wing elements together in the same guide strut ensures that the passenger can use a surface that is symmetrical on both opposing sides.

At least one of the wing elements preferably forms a seating surface section to be sat upon with the buttocks. The device preferably has at least two, preferably precisely two or three wing elements that are designed as seating surface sections. As an additional option, at least one wing element, in particular precisely one wing element, includes a backrest section for leaning against and/or lying upon with the back and/or head. It is also preferred that the device have at least one wing element, preferably precisely one wing element, which includes a leg rest and/or footrest section upon which to place the legs and/or feet.

For example, at least one of the wing elements differs from the other wing elements in terms of a dimension, shape and/or useful surface. In particular, the at least one wing element that differs from the other ones is configured as a backrest section or a footrest section. In this case, the other wing elements are preferably designed as seating surface sections.

Another aspect of the present disclosure involves a vehicle with the sitting, reclining and/or leaning device described above. It is especially preferred that the vehicle include have several such devices. In a preferred embodiment of the present disclosure, the vehicle has the vehicle structure, in particular the vehicle floor and at least one vehicle wall. For example, the vehicle wall is designed as a side wall of the vehicle, which extends co-directionally to a traveling direction of the vehicle. As an alternative, the vehicle wall is designed as a front or rear wall of a vehicle, which in particular runs transverse to the traveling direction of the vehicle. It is preferred that the device be anchored in the vehicle structure. In particular, a first device may be anchored in the vehicle floor, and a second device may be anchored on an adjacent vehicle wall, so that the first device has several seating surface sections and optionally also a leg rest and/or footrest section, and so that the second device has several backrest sections. As a result, the passenger of the vehicle can use both devices at the same time. In particular, the passenger may sit on the first device with his or her buttocks, and possibly rest his or her legs and/or feet, and lean against the second device with his or her back and/or head.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
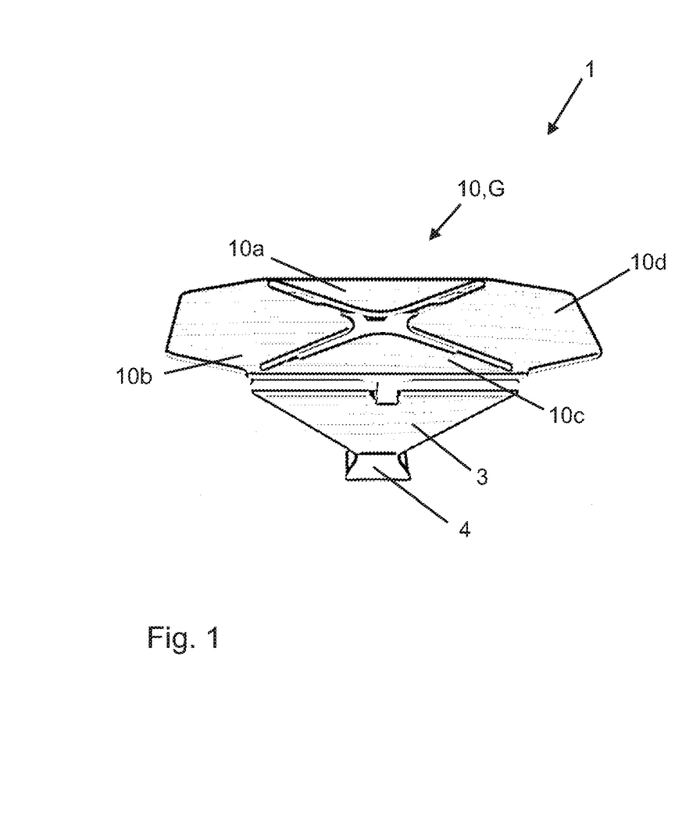
FIG. 1 is a perspective plan view from the front of a sitting, reclining and/or leaning device for a vehicle.
Figure 7:
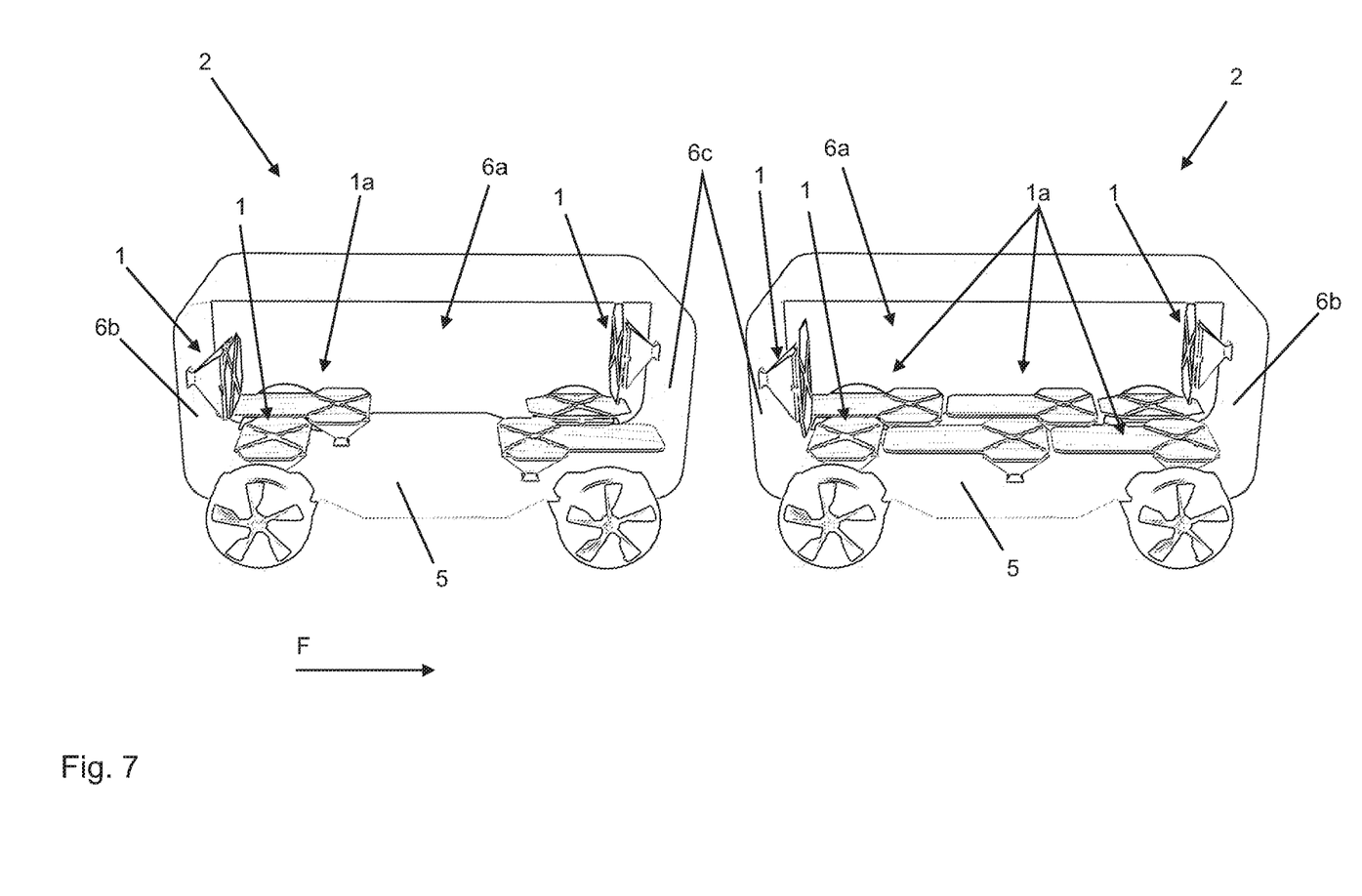
FIG. 7 are two schematically depicted vehicles with a vehicle floor and a vehicle wall, wherein several different sitting, reclining and/or leaning devices are anchored in the vehicles.

FIG. 1 shows a perspective plan view from the front of a sitting, reclining and/or leaning device 1, which is configured to be arranged in a vehicle 2 (FIG. 7). The sitting, reclining and/or leaning device 1 will be further referred to as a configurable seating device or simply device. The device 1 is configured to provide a passenger of the vehicle 2 with a seating option upon which to sit, a reclining option upon which to lie and/or rest his or her feet and/or legs, or a leaning option against which to lean in the vehicle.

Figure 2:
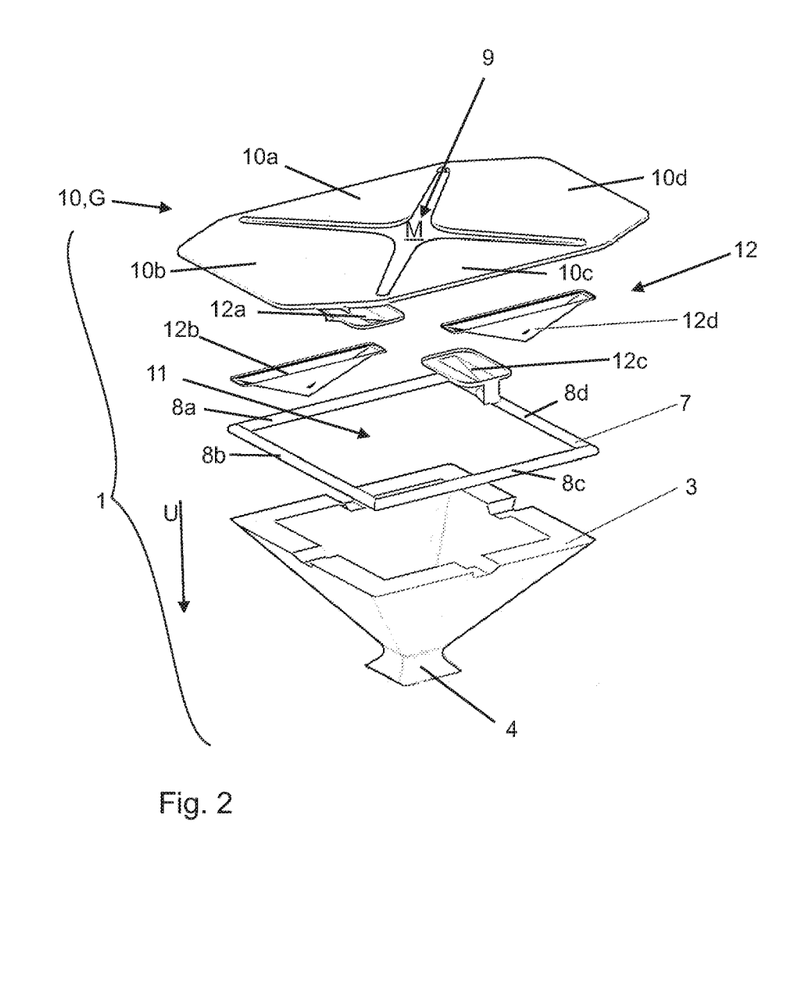
FIG. 2 is an exploded view of the sitting, reclining and/or leaning device on FIG. 1.

FIG. 2 shows the device 1 in an exploded view. The device 1 includes an essentially triangular, in particular pyramidal and/or funnel-shaped base 3. The base 3 has a foot 4, which may be used to anchor the device 1 in the vehicle 2, in particular on a vehicle floor 5 or in a vehicle wall 6a, 6b (FIG. 7). The device 1 has a seat frame 7, which is quadrangular, in particular square, in design. The seat frame 7 has four frame sides 8a, 8b, 8c, 8d. The seat frame 7 is arranged on the base 3 and/or held and/or supported by the base 3.

The device 1 has several wing elements 10, e.g., four wing elements 10a, 10b, 10c, 10d. The wing elements 10a and 10c are essentially triangular in design, and the wing elements 10b and 10d are essentially pentagonal. The wing elements 10 are arranged like cloverleaves relative to each other.

The wing elements 10 have a basic position G. In the basic position G, the wing elements 10 are arranged in a shared plane 9. The plane 9 is parallel and/or co-directional to an additional plane 11 that is spanned by the seat frame 7. In an alternative exemplary embodiment, the shared plane 9 can lie in the additional plane 11.

The wing elements 10 may be arranged separately and/or independently of each other in the plane 9, or may be movably joined and/or hinged with each other. For example, the wing elements 10 may be a hard plastic, fiber-reinforced plastic or metal, in particular a steel alloy.

Figure 3:
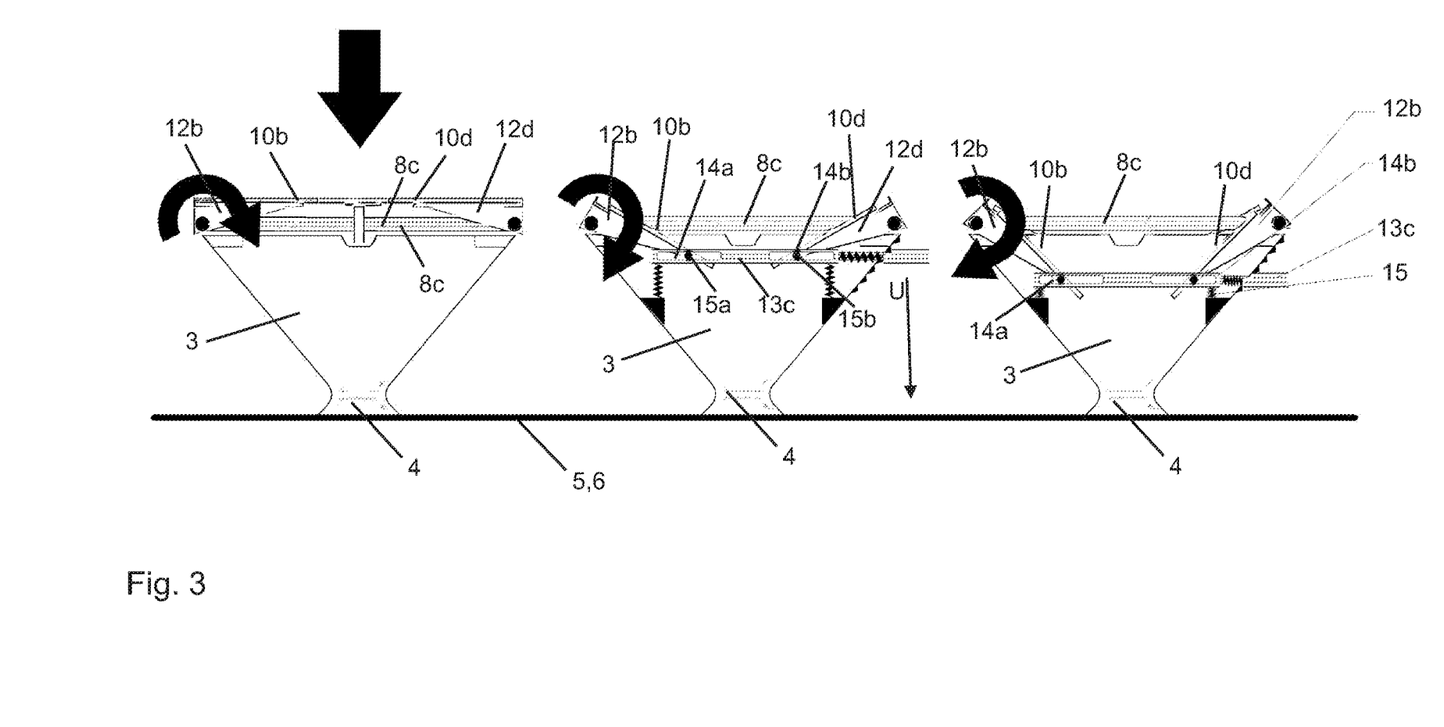
FIG. 3 is a side view of the sitting, reclining and/or leaning device on FIG. 1, depicting the swiveling of wing elements of the sitting, reclining and/or leaning device from a basic position into a swivel position.

The device 1 has several swivel mechanisms 12, e.g., four swivel mechanisms 12a, 12b, 12c, 12d. Each of the swivel mechanisms 12 is allocated to one of the wing elements 10. The wing elements 10 lie on the respectively allocated swivel mechanism 12, and are fastened thereto. The wing elements 10 are swivelably joined with the seat frame 7 via the swivel mechanisms 12. As a result, the wing elements 10 may be swiveled relative to the plane 9 and/or to the seat frame 7 into at least one swivel position S (FIG. 3). Each of the wing elements 10 may be swiveled downward U out of the plane 9 or out of the additional plane 11, in particular toward the vehicle floor 5 or toward the vehicle wall 6 (FIG. 7), into several possible swivel positions S. To move the wing elements 10 into one of the swivel positions S, the passenger sits down on the wing elements 10 arranged in the basic position G, and presses them downward U in a middle M of the cloverleaf-like arrangement.

FIG. 3 presents a sectional view of the device 1 shown in FIG. 1. The device 1 has several guide struts 13, for example four guide struts 13a, 13b, 13c, 13d, which are arranged on the base 3. Each of the guide struts 13a, 13b, 13c, 13d extends parallel and/or co-directional to one of the frame sides 8a, 8b, 8c, 8d. In the basic position G of the wing elements 10, the guide struts 13 are arranged at the same height as the frame sides 8. It is also possible that the ends of each of the guide struts 13 be elastically supported against the base 3.

Only the third guide strut 13c of the four guide struts 13a, 13b, 13c, 13d is visible in FIG. 3. The guide struts 13 are configured to guide the swivel mechanisms 12. In particular, two of the respective swivel mechanisms 12 are guided in at least one shared guide strut 13. To this end, each of the guide struts 13 have a first and second guideway 14a, 14b.

Each of the guide struts 13 may be vertically adjusted relative to the corresponding frame side 8. To this end, the guide struts 13 are movably mounted to the base 3, in particular spring-mounted. According to FIG. 3, the second and fourth swivel mechanisms 12b, 12d are guided in the third guide strut 13c. Not visible is that the second and fourth swivel mechanisms 12b, 12d are also guided in the first guide strut 13a. The first and third swivel mechanisms 12a, 12c are preferably guided in the second and fourth guide struts 13b, 13d, which also is not visible on FIG. 3. As a consequence, two respective oppositely arranged wing elements 10a, 10c and 10b, 10d are guided into the respective guide struts 13a, 13c and 13b, 13d via the swivel mechanisms 12a, 12c and 12b, 12d allocated thereto.

In the at least one swivel position S of the wing elements 10b, 10d, and thus of the allocated swivel mechanisms 12b, 12d, the corresponding guide struts 13a, 13c are, as a function of the extent of the swivel position S, vertically adjusted, downwardly U lowered and thus arranged underneath the corresponding frame side 8. The swivel mechanisms 12b, 12d are moved in the guideways 14a, 14b as a function of the extent of the swivel position S.

Each of the guide struts 13 has at least one latch 15 for the at least one swivel mechanism 12 guided therein. In particular, each guideway 15a, 15b has a latch 15a, 15b allocated to it. As a result, the swivel mechanisms 12b, 12d movably mounted in the guideways 14a, 14b together with the wing elements 10b, 10d allocated to them may be latched in the respective swivel position S. This ensures that the wing elements 10 cannot be inadvertently released from the swivel position S. It is possible for the passenger to release the wing elements 10 from the swivel position S manually or by activating an actuator, and move them to another swivel position S, or swivel the wing elements 10 back into the basic position G.

Figure 4:
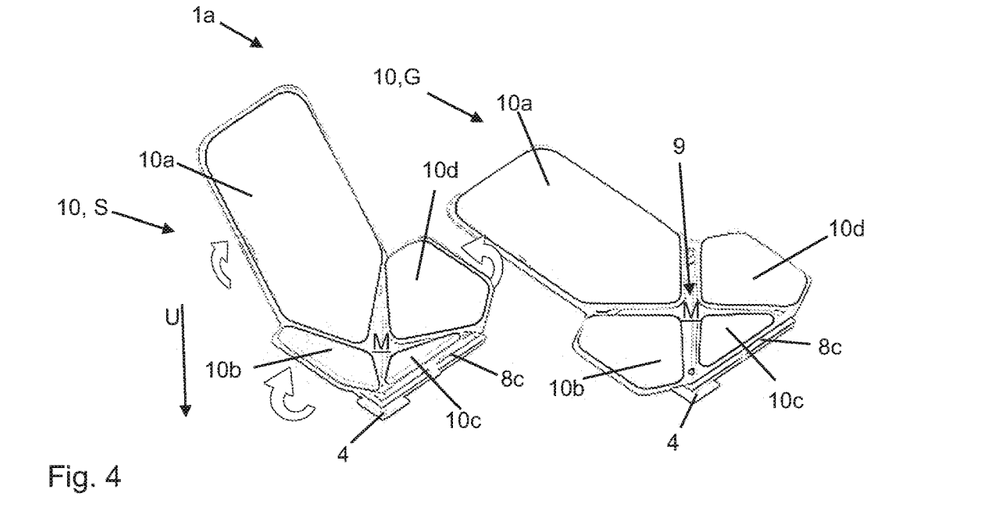
FIG. 4 is a perspective plan view from above of an alternative sitting, reclining and/or leaning device in a swivel position and in the basic position.

FIG. 4 presents a perspective plan view from above of a modified device 1a. The modified device 1a has four wing elements 10a, 10b, 10c, 10d. All wing elements 10 are arranged like cloverleaves relative to each other. The wing elements 10 are swiveled from the basic position G (right in the image plane on FIG. 4) relative to the plane 9 into the at least one swivel position S (left in the image plane on FIG. 4).

The second and fourth wing elements 10b, 10d are arranged opposite each other and have a pentagonal design. The first wing element 10a and the third wing element 10c are arranged opposite from each other. The third wing element 10c is triangular in design, and the first wing element 10a pentagonal. However, the first wing element 10a differs from the others by a different shape, in particular having a greater length and larger useful surface. The first wing element 10a is designed as a backrest section, against which the passenger can lean his or her back and head, or on which the passenger can lay his or her back and head, in particular when the swivel position S of the wing element 10 is a lying position.

The three other wing elements 10b, 10c, 10d are swiveled downwardly U to a point where the passenger can sit on them comfortably, in particular based on the size and/or width of his or her buttocks.

Figure 5:
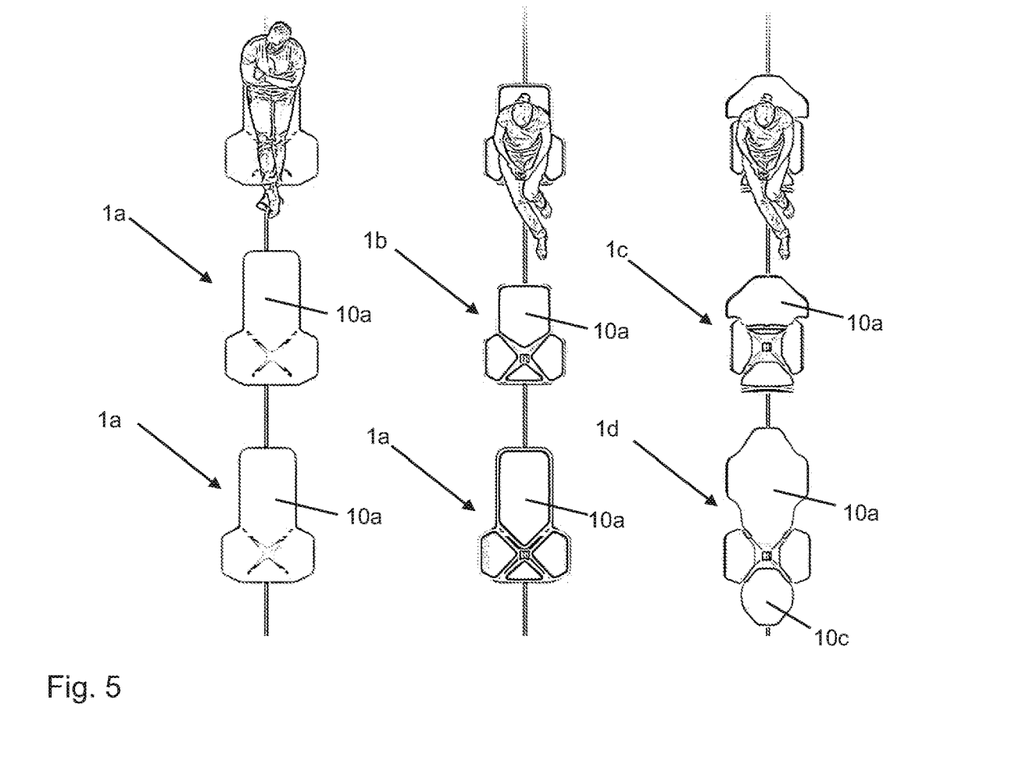
FIG. 5 is a summary view of several sitting, reclining and/or leaning devices, in a plan view from above with wing elements differing in shape, size and/or useful surface

FIG. 5 presents a summary view with several sitting, reclining and/or leaning devices 1a, 1b, 1c, 1d in a plan view from above. The devices 1a, 1b, 1c, 1d include the wing elements 10a, 10b, 10c, 10d, wherein in particular the wing elements 10a and 10d can vary in design with respect to shape, size and/or useful surface.

For example, the first wing element 10a in devices 1a is designed as described on FIG. 4, and suitable for leaning the back and head against. The first wing element 10a of the device 1b is somewhat shorter in length than that of the device 1a, and thus suitable for leaning the back against. The first wing element 10a of the device 1c is shaped like a wing, and thus suitable for leaning the backs of heavier passengers against or resting the arms of the passenger on the side, in particular in the at least one swivel position S (FIG. 3, 4) or in the lying position. The first wing element 10a of the device 1d is essentially shaped like a cross. This is suitable for leaning the backs of heavier passengers against and additionally the head and/or resting the arms of the passenger on the side, in particular in the at least one swivel position S or in the lying position. The device 1c also has a third wing element 10c, which is shaped like an egg or essentially a circle, and is a structurally possible configuration of a leg rest and/or footrest. This and the other wing elements 10, in particular those designed for sitting on, can alternatively have a triangular, rectangular, cloverleaf or heart-shaped contour.

Figure 6:
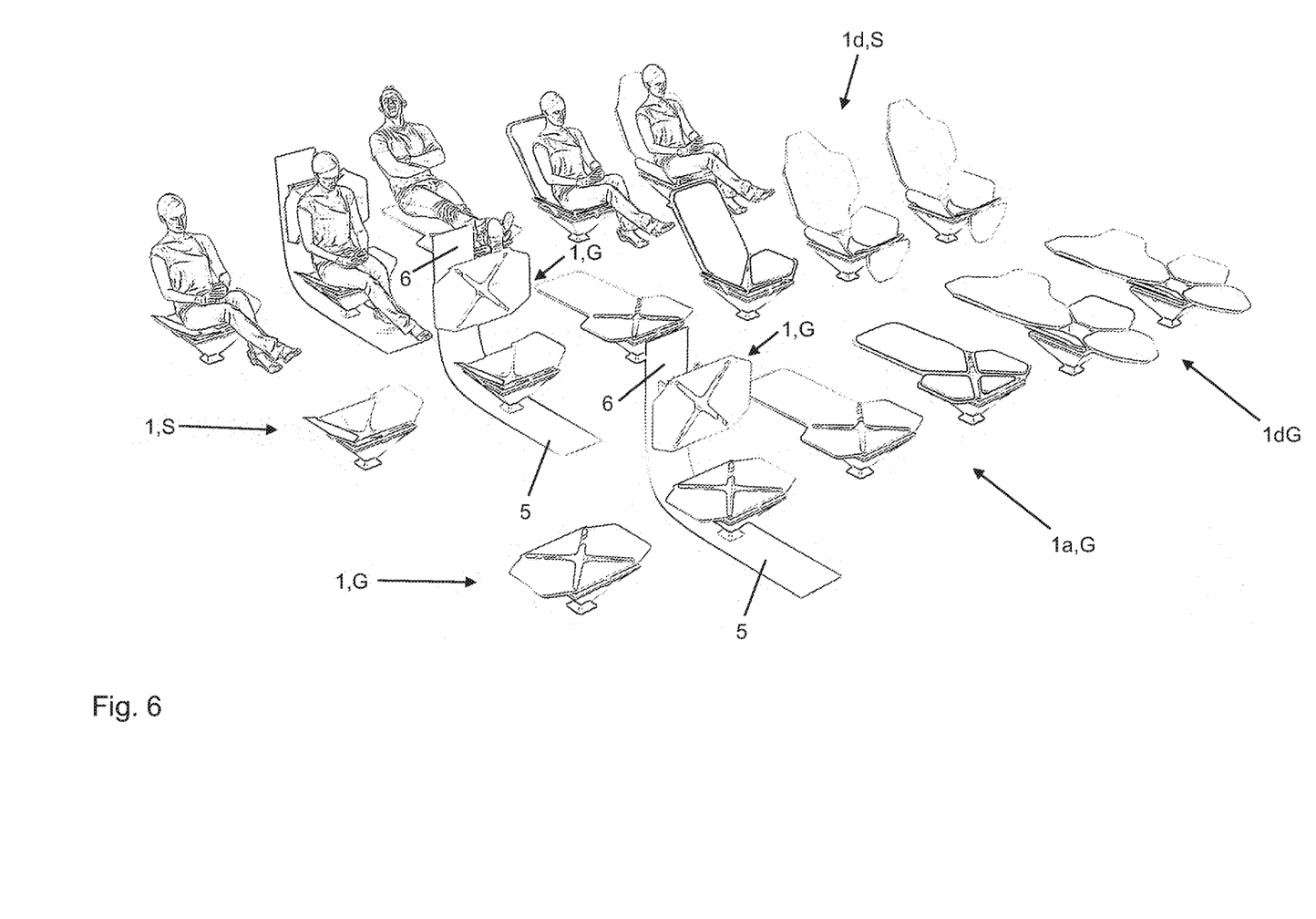
FIG. 6 is another summary view of several sitting, reclining and/or leaning devices in a perspective plan view from the side with wing elements differing in shape, size and/or useful surface in the basic position or in possible swivel positions.

FIG. 6 presents another summary view of various sitting, reclining and/or leaning devices 1, 1a, 1b, 1d in a perspective view from the side. The devices 1, 1a, 1b, 1d are shown in the basic position G and in a swivel position S. In particular, the wing elements 10 of the individual devices 1, 1a, 1b, 1d can have various shapes, sizes and/or lengths, and be moved into the at least one swivel position S however desired, in particular each in pairs one opposite the other. FIG. 6 also shows the option of having two devices 1 enhance each other. In this case, one of the devices 1f is anchored on the vehicle floor 5, and the other device 1w on the vehicle wall 6. As a result, the device 1f anchored on the vehicle floor 5 forms a seating surface, on which the passenger can sit with his or her buttocks, and the other device 1w anchored in the vehicle wall 6 forms the leaning surface against which the passenger can lean with his or her back and/or head.

FIG. 7 presents a schematic illustration of two vehicles 2, which have the vehicle floor 5 and vehicle wall 6 as the vehicle structure. The vehicle wall 6 can extend parallel to a traveling direction F of the vehicle 2, and be designed as a side wall 6a of the vehicle. It can also run transverse to the traveling direction F. In this case, the vehicle wall forms a front wall 6c or rear wall 6b of the vehicle 2. Several of the devices 1 and alternative devices 1a are arranged in the two depicted vehicles 2. A respective two of the devices 1, of which one is anchored on the vehicle floor 5 and the other on the rear wall 6b or front wall 6b, enhance each other in terms of their functions as a seating surface and leaning surface. A variable, flexible and versatile use of the devices 1, 1a is offered in the vehicles. In particular, the arrangement of devices 1, 1a provides for a novel use of a vehicle interior. The devices 1, 1a include the main equipment of a vehicle interior. Other equipment, such as a dashboard, central console or the like, is largely or even completely eliminated. In particular, this main equipment may be used in so-called self-driving or autonomous vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

The invention claimed is:

1. A configurable seat for a vehicle comprising:
   a seat frame; and
   a plurality of wing elements arranged together in a cloverleaf shape where each of the plurality of wing elements comprises a triangular or pentagonal shape pointing toward a middle of the cloverleaf shape, each wing element being pivotally coupled to the seat frame along an edge including a first wing element forming a seating surface to be sat upon, wherein the wing elements may be arranged in a shared plane with the seating surface in a basic position and may be swiveled out of the basic position into a plurality of swivel positions, wherein the plurality of wing elements are each configured to move into each of the plurality of swivel positions by pressing in the middle of the cloverleaf shape.

2. The configurable seat according to claim 1, further comprising a plurality of swivel mechanisms such that each wing element is pivotally coupled with the seat frame by its respective swivel mechanism.

3. The configurable seat according to claim 2, further comprising a base supporting the seat frame and anchoring the configurable seat to a vehicle structure.

4. The configurable seat according to claim 3, wherein the base is pyramidal in shape.

5. The configurable seat according to claim 2, further comprising a plurality of guide struts such that each of the plurality of swivel mechanisms is movably mounted in at least one guide strut.

6. The configurable seat according to claim 5, further comprising a base supporting the seat frame and anchoring the configurable seat to a vehicle structure, wherein the plurality of guide struts are mounted on the base and adjustable relative to the seat frame.

7. The configurable seat according to claim 6, wherein at least one of the guide struts is adjusted when at least one of the plurality of swivel mechanisms is guided therein together with a corresponding one of the plurality of wing elements is swiveled into the at least one swivel position.

8. The configurable seat according to claim 7, wherein each of the guide struts has at least one latch for the swivel mechanism guided therein, wherein the at least one latch is configured to latch the swivel mechanism in the basic position and in the at least one swivel position.

9. The configurable seat according to claim 5, wherein a pair of the plurality of wing elements are arranged in an opposed position with respect to the seat frame and are guided in a shared guide strut via the swivel mechanisms allocated to the two opposed wing elements.

10. The configurable seat according to claim 2, wherein the wing elements comprise four wing elements arranged in the cloverleaf shape relative to each other.

11. The configurable seat according to claim 10, wherein two of the four wing elements have the triangular shape and another two of the four wing elements have the pentagonal shape.

12. The configurable seat according to claim 2, wherein the plurality of wing elements comprise a second wing element forming a backrest and a third wing element forming a leg rest section.

13. The configurable seat according to claim 2, wherein at least one of the plurality of wing elements differs from the other wing elements in terms of length, useful surface or shape.

14. A vehicle comprising a vehicle structure and a configurable seat according to claim 2.

15. The vehicle according to claim 14, wherein the vehicle structure comprises a vehicle floor and a vehicle wall, wherein the configurable seat is anchored to the vehicle floor.

16. The vehicle according to claim 15, further comprising a second second configurable seat anchored to the vehicle wall.

17. A configurable seat for a vehicle comprising:
   a seat frame; and
   four wing elements, each wing element pivotally coupled to the seat frame along an edge, including a first wing element having an elongated pentagonal shape, a second wing element disposed across a middle from the first wing element and having a triangular shape, and third and fourth wing elements disposed across the middle from each other, wherein the third and fourth wing elements are pentagonal shaped,
   wherein the middle defines a shared plane, wherein the four wing elements are positionable to be disposed flat in the shared plane and are positionable in a number of swivel positions wherein the four wing elements extend from the shared plane at angles configured in sitting, reclining and leaning dispositions.

\* \* \* \* \*